US012511941B2

United States Patent
Gerasimov et al.

(10) Patent No.: US 12,511,941 B2
(45) Date of Patent: Dec. 30, 2025

(54) SYSTEM AND METHOD OF LIVENESS DETECTION WITH PRESERVATION OF ORIGINAL IMAGE CHARACTERISTICS

(71) Applicant: UNICOTECH PORTUGAL, UNIPESSOAL LDA, Lisbon (PT)

(72) Inventors: Artem Gerasimov, Dubai (AE); Yury Litvinov, Almaty (KZ); Ivan Kryachko, Almaty (KZ); Bakai Zhamgyrchiev, Almaty (KZ); Svetlana Efimova, Dubai (AE)

(73) Assignee: UNICOTECH PORTUGAL, UNIPESSOAL LDA, Lisbon (PT)

( * ) Notice: Subject to any disclaimer, the term of this patent is extended or adjusted under 35 U.S.C. 154(b) by 255 days.

(21) Appl. No.: 18/360,105

(22) Filed: Jul. 27, 2023

(65) Prior Publication Data

US 2025/0037505 A1    Jan. 30, 2025

(51) Int. Cl.
| | |
|---|---|
| *G06K 9/00* | (2022.01) |
| *G06T 7/11* | (2017.01) |
| *G06T 9/00* | (2006.01) |
| *G06V 10/764* | (2022.01) |
| *G06V 40/40* | (2022.01) |

(52) U.S. Cl.
CPC .............. *G06V 40/40* (2022.01); *G06T 7/11* (2017.01); *G06T 9/00* (2013.01); *G06V 10/764* (2022.01)

(58) Field of Classification Search
CPC .... G06V 40/45; G06V 40/172; G06V 40/161; G06V 40/168; G06V 10/82; G06V 40/40; G06V 40/166; G06V 10/764; G06V 40/165; G06V 40/169; G06V 40/193; G06V 10/143; G06V 40/18; G06V 2201/12; G06V 10/803; G06V 40/175; G06V 20/46; G06V 40/1382; G06V 40/1388; G06V 40/14; G06F 21/32; G06F 18/211; G06F 18/214; G06F 18/253; G06F 18/251; G06F 18/25; G06N 3/08; G06N 3/045; G06N 3/04; G06N 3/084; G06N 3/0455; G06N 3/0464; G06N 3/09
See application file for complete search history.

(56) References Cited

U.S. PATENT DOCUMENTS

| | | | |
|---|---|---|---|
| 10,671,870 B2 | 6/2020 | Ma | |
| 11,367,189 B2 | 6/2022 | Clymer et al. | |
| 2005/0147291 A1* | 7/2005 | Huang | G06V 40/172 382/218 |

(Continued)

FOREIGN PATENT DOCUMENTS

| | | |
|---|---|---|
| CN | 114663957 A | 6/2022 |
| CN | 114998963 A | 9/2022 |
| JP | 2002123834 A | 4/2002 |

*Primary Examiner* — Alex Kok S Liew
(74) *Attorney, Agent, or Firm* — ESPE Legal Consultancy FZ-LLC

(57) ABSTRACT

Systems and methods for detecting liveness of imagery data. The imagery data, i.e., an image, is captured by an imagery application installed on a smartphone. The image is encoded and transferred to the liveness detector. At the liveness detector, the image is decoded and split into a set of patches by an image processor. Each of the sets of patches is analyzed. A liveness detector analyzes each patch of the set individually to determine if the patch is live or fake. By aggregating analysis results of all patches, liveness of the image is detected.

20 Claims, 4 Drawing Sheets

(56) References Cited

U.S. PATENT DOCUMENTS

2008/0022230 A1\* 1/2008 Ogawa ................ G06F 3/04812
　　　　　　　　　　　　　　　　　　　715/838
2017/0004352 A1\* 1/2017 Jonsson ............. G06V 40/1376
2019/0251380 A1\* 8/2019 Park ..................... G06V 10/803

\* cited by examiner

SYSTEM AND METHOD OF LIVENESS DETECTION WITH PRESERVATION OF ORIGINAL IMAGE CHARACTERISTICS

TECHNICAL FIELD

The present disclosure generally relates to liveness detection of imagery data. In particular, the present disclosure relates to detecting liveness of the imagery data without compromising original imagery data characteristics.

BACKGROUND

Since the introduction of smart devices, such as smartphones, tablets, laptops, smartwatches, and the like, there has been a rapid growth in technology. Smart devices, and particularly smartphones, have become an integral part of our daily lives as they offer a vast variety of functionalities, including personal databases, jukeboxes, cameras, communications hubs, and communications gateways. More particularly, smartphones have been increasingly used to store and communicate sensitive financial and personal information. Accordingly, a reliable assessment of an identity of the smartphone's user is emerging as an important new service.

Various applications have been developed to cater to different types of financial transactions including real estate transactions, insurance orders, and other areas where sensitive data is processed. Such sensitive services provided by banks, government organizations, medical institutions, and the like where critical data is processed are often under scrutiny of attackers, hackers or fraudsters who try to steal protected personal information or impersonate another person. In order to prevent identity theft attacks, applications impose a high level of security in identifying the user's identity, including by use of imagery data, such as photos or videos.

The imagery data may be vulnerable to various attacks, such as morphing attacks or spoofing attacks when an attacker impersonates an authorized device or user to steal data, spread malware, or bypass access control systems. One emerging spoofing technique is related to facial recognition. Since many people now use such technology to unlock their phones or apps, cybercriminals are exploring how to exploit potential vulnerabilities. For example, researchers have demonstrated that it is possible to use 3D facial models built from pictures available on social media to unlock the user's device via face ID. Further implications for this technology include simulating embarrassing or even criminal video footage of high-profile individuals, such as celebrities, politicians, and business leaders in order to extort money. Preventing such attacks by identifying the liveness of the images is therefore important.

Photos or videos provided by users may be fake, such as those impersonating another user. Therefore, before carrying out any financial transaction, determining authenticity of the photo or video is critical in order to prevent impersonating or morphing attacks. There exist various image processing techniques, based on machine learning modules, configured to perform image analysis. The image analysis may consist of a set of models, where each model may process either a part of the image feature, or specific objects identified in the image, or certain areas of the image with one or another characteristic. Each model requires an image input with fixed matrix size and predefined characteristics, such as normalization of the object including resizing. Therefore, it is vital to provide input of predetermined size with expected normalization to each model for effective image analysis.

Image processing, prior to analysis performed by the analysis model, may result in the loss of important features characterizing a particular attack, for example, when increasing and decreasing the image size, certain pixels, or a characteristic connection between them. Such features can characterize the image as a fake and loss of such characteristics may lead to the attack going undetected. Therefore, it is critical to ensure the integrity of the image from the moment the image was captured until its transfer to the analysis model in its entirety. Any distortion of the image or image container that includes its metadata will greatly affect the verdict and the level of detection in general.

Therefore, there is a need for systems and methods for detecting liveness of the imagery data by preserving original imagery data characteristics. Further, there is a need for efficient and robust classification of whether a video or an image recorded for the purpose of biometric identification contains real person or some kind of face spoofing attacks even of unknown type at the time the system was designed.

SUMMARY

The present disclosure relates to detection of liveness of an imagery data, such as images, by preserving original characteristics of the imagery data. In an embodiment, systems and methods can form sets of input frames that can be transferred to an analysis model without any distortion of characteristics in order to ensure the most efficient operation of each model individually and all models in combination.

In an embodiment, a method for detecting liveness of an imagery data, implemented by a liveness detector comprises: capturing the imagery data by an image capturing device; encoding the imagery data by at least one of an image encoder and a video encoder to generate encoded imagery data; transferring the encoded imagery data to a liveness detector by a transfer component; receiving the encoded imagery data by an image receiver; decoding the encoded imagery data by at least one of an image decoder and a video decoder; splitting the imagery data into a set of patches by an image processor, wherein a size of a patch is based on prerequisite of a machine learning model utilized by the liveness detector; detecting liveness of the imagery data by the liveness detection component, wherein detecting liveness includes: determining liveness of the imagery data by analyzing each patch by a machine learning model, and aggregating a result of the processing of each patch with another machine learning model to determine the liveness of the imagery data.

In one aspect, splitting the imagery data into the set of patches comprises splitting the imagery data in the same size of patches allowing the patches to overlap each other.

In one aspect, a method further comprises aligning an interference pipeline and a training of machine learning models pipeline in an identical order to ensure that no information is lost during transformations and there is no difference between transformations impact during training and inference.

In one aspect, a method further comprises training the machine learning model based on multiple sets of patches for high resolution representation including sets of maximum squares covering an original imagery data, stochastic sets of overlapping patches without resizing the original imagery data, sets of overlapping patches with predefined disposition and quantity and without resizing the original imagery data.

In one aspect, a method further comprises training the machine learning model in an Out Of Distribution (OOD)

aware mode wherein OOD aware mode, wherein the OOD aware mode comprises: using extensive and diverse database of original imagery data; including known types of attacks in training and validation of datasets; and training the machine learning model to capture at least one specific property of original data to distinguish between original and non-original data.

In one aspect, a method further comprises implementing a machine learning model to determine liveness of the imagery data, wherein implementing the machine learning model comprises determining authenticity of a first image by a first image analysis module that comprises: determining an appropriate size of the first image, splitting the first image into a set of patches of determined size, sending the set of patches to the first image analysis module, analyzing, independently, each patch of the set of the patches by the first image analysis module, and aggregating scores generated by the first analysis module for each patch, determining, based on the aggregated score, that the first image is live.

In one aspect, the set of patches are randomized or predefined.

In one aspect, a method further comprises confining the imagery data to a container.

In one aspect, a method further comprises implementing a second machine learning model to determine liveness of the imagery data, and wherein implementing the machine learning model comprises determining authenticity of a first image by a second image analysis module that comprises: determining an appropriate size of the first image for the second machine learning model, splitting the first image into a set of patches of determined size, sending the set of patches to the second image analysis module, analyzing, independently, each patch of the set of the patches by the second image analysis module, aggregating scores generated by the second analysis module for each patch, determining, based on the aggregated score of the first analysis module and the second analysis module, that the first image is live.

In an embodiment, a system for liveness detection comprises an image capturing device to capture imagery data; an image encoder to encode the imagery data to generate encoded imagery data; a transfer component to transfer the imagery data to a liveness detector; an imagery data receiver to receive the encoded imagery data from the transfer component, an image decoder to decode the imagery data, an image processor to split the imagery data into a set of patches, wherein the size of a patch is based on prerequisite of a machine learning model utilized by the liveness detector; a liveness detection component configured to: classify the imagery data based on authenticity, wherein the liveness detection component is configured to analyze each of the set of patches by a machine learning model, and aggregate a result of the processing of each patch to determine the authenticity of the imagery data.

In an embodiment, a system for liveness detection of an image comprises a first machine learning model trained on a first plurality of image data including a first plurality of patch data; a second machine learning model trained on a second plurality of image data including a second plurality of patch data; an image processor configured to split the image into a set of patches; and a liveness detection module configured to: determine an authenticity of each patch in the set of patches by analyzing each patch in the set of patches using the first machine learning model, and classify the authenticity of each patch to determine a liveness of the image data using the second machine learning model.

The foregoing general description of the illustrative embodiments and the following detailed description thereof are merely exemplary aspects of the teachings of this disclosure and are not restrictive.

DETAILED DESCRIPTION

The present disclosure relates to liveness detection of imagery data with preserving the original characteristics of the imagery data.

Figure 1:
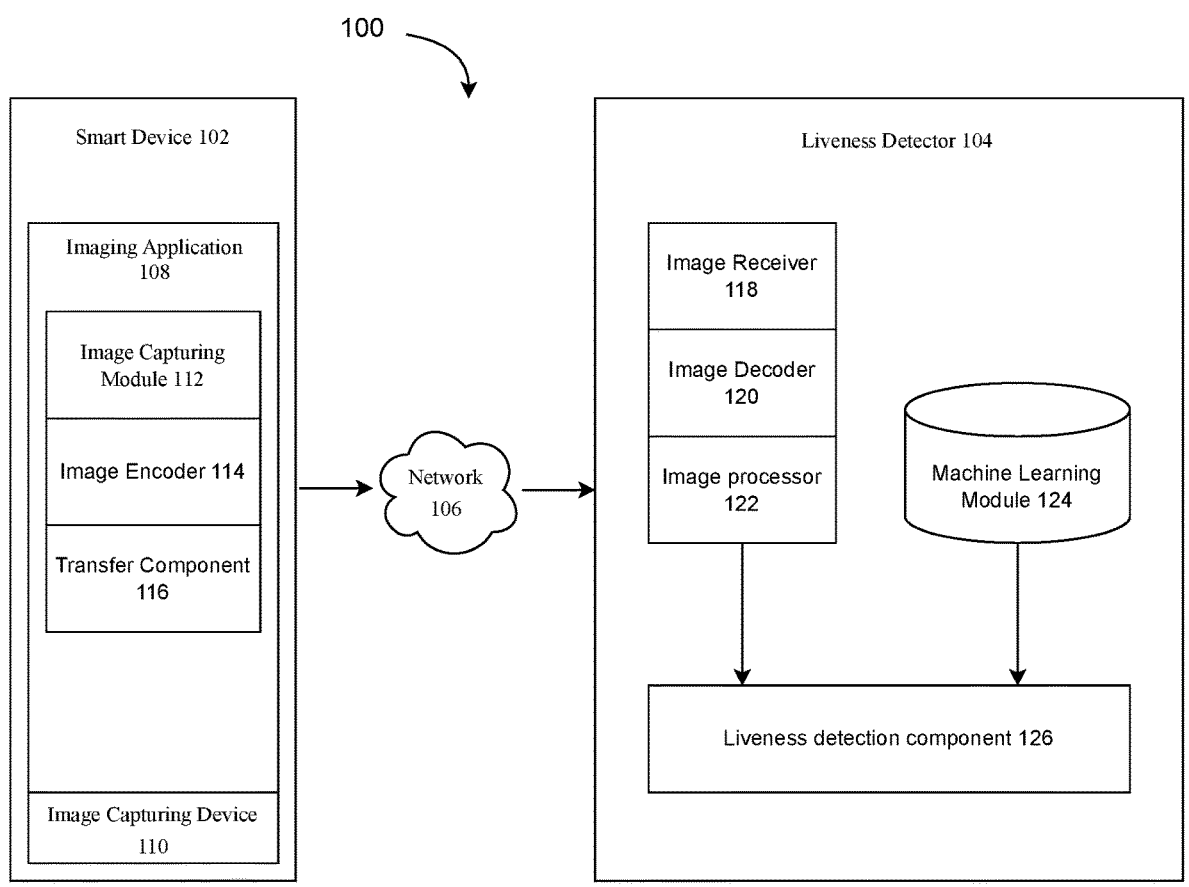
FIG. 1 is a block diagram of a system, in accordance with an embodiment.

FIG. 1 is a block diagram of a system for detecting liveness of imagery data, in accordance with an embodiment. The system is implemented over a network 106 and generally includes, but may not be limited to, a smart device 102 and a liveness detector 104. The smart device 102 is configured to capture imagery data and transfer the imagery data to the liveness detector 104 for detecting liveness of the imagery data, while preserving the characteristics of the imagery data.

In an embodiment, the smart device 102 includes a mobile device, such as a smartphone, a tablet, or the like. The smart device 102 may be any computing device, such as a desktop computer, a laptop, a tablet computer, a mobile device, a Personal Digital Assistant (PDA) or any other computing device. The smart device 102 may include processor 302, memory, and communication interface. To establish communication with other components connected within the system, the Communication interface may implement industry promulgated protocol standards, such as Ethernet IEEE 802.3, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

In one embodiment, the smart device 102 is a smartphone configured with an imaging application 108. In an embodiment, the imaging application 108 may be installed on the smartphone. In another application, the imaging application 108 may be a third-party application coupled to the smartphone over a network. The imaging application 108 may refer to, but is not limited to, a software application coupled to hardware components, which in combination allows an individual or a computer program to perform an image capturing activity as intended for liveness detection. The imaging application 108 includes, but may not be limited to, an image capturing device 110, a capturing module 112, an image encoder 114, and transfer component 116.

The image capturing device 110 is configured to capture imagery data, such as an image, video, and the like. In an embodiment, the imaging application 108 is coupled to the image capturing device 110. In some examples, the image capturing device 110 can be a primary camera or a secondary camera integrated with the smartphone, an integrated camera of the laptop, a camera externally coupled to the personal computer, a stand-alone camera, and the like. The imaging application 108, in one example, may be installed on the smart device. The imaging application 108, in another example, may be a third-party application that can be accessed over the network.

In an embodiment, the imaging application 108 includes the image capturing module 112 which is configured to operate the image capturing device 110. The image capturing module 112 may include one or more software components, to computer executable instructions to control one or more hardware components, such as the image capturing device 110, i.e. camera, or hardware components to perform functions, such as multi-sensor modules, i.e., to gauge the distance between the image capturing device 110 and the target in order to adjust the focus of the camera, or a combination thereof, such as an actuator module to adjust the focus of the lens of the camera and so on. In one embodiment, the image capturing module 112 is configured to prepare the imagery data for processing and confine the data into a container. For example, a container can be an object or location capable of holding the imagery data, such as the pixels and metadata corresponding to the imagery data. In another example, the container can be the imagery data and software that contains everything needed to run a computer program (such as the processing described herein), including a complete file system, code, system tools, and system libraries. In other embodiments, a container can be utilized for sub-operations of the processing (such as a container for each patch).

In an embodiment, the imaging application 108 further includes the image encoder 114. In an embodiment, the imaging application 108 includes a video encoder. The image encoder 114 is coupled to the image capturing module 112 to receive the imagery data; and is configured to encode the imagery data based on certain encoding techniques. In an embodiment, the image encoding refers to transformation of the image, by the way of compression, encryption, or alteration of the pixels. The transformation can be conducted prior to sending the imagery data to the analysis model, both during training, and interference phases. Some examples of the encoding technique may include Run-length encoding (used in default method in PCX and as one of possible in BMP, TGA, TIFF), Area image compression, Predictive coding, Entropy encoding, Adaptive dictionary algorithms, such as LZW, Deflate compression, Chain codes, and the like.

In an embodiment, the imaging application 108 includes the transfer component 116 to transfer the encoded patches of the imagery data to the liveness detector 104. The transfer component 116 may be based on one or more image transfer protocols, such as Image Transmission Protocol (ITP), Picture Transfer Protocol (PTP), TCP/IP, Fast Lossy Internet Image Transmission Scheme, and such similar protocols. Few examples include MPEG-DASH, live streaming HTTP (HLS) or other transmission methods.

The encoded patches of the imagery data, which is transmitted by the transfer component 116, are received by the liveness detector 104 for processing the imagery to detect the liveness, in accordance with an embodiment. The liveness detector 104 includes, but may not be limited to, the image receiver 118, an image decoder 120, an image processor 122, a machine learning module 124, and a liveness detection component 126.

In an embodiment, the image receiver 118 is configured to facilitate at least one transmission protocol to receive the imagery data. The image receiver 118 implements the same transmission protocol as that of the transfer component 116. The transmission protocol can be an Image Transmission Protocol (ITP), Picture Transfer Protocol (PTP), TCP/IP, Fast Lossy Internet Image Transmission Scheme, or such similar protocols. Few examples of the transmission protocol include MPEG-DASH and live streaming HTTP (HLS).

In an embodiment, the liveness detector 104 includes the image decoder or a video decoder 120 to decode the imagery data received by the image receiver 118. Image decoding is the process of converting the encoded image back to an uncompressed bitmap which can then be rendered on the screen. This involves the exact reverse of the operations involved in encoding the image. In an embodiment, image decoding refers to converting the image back to the original format by the way of decompression, decryption, or alteration of the pixels into original form.

In an embodiment, the imagery data is split into a set of patches by the image processor 122. The set of patches are randomized—patches can be captured from random pixels. For example, randomly selected pixels could be the top left edge of the patch In another embodiment, the set of patches are predefined. The patches can be a group of pixels in an image. For example, an image with 20×20 pixels can be divided into 100 square patches of size 2×2 pixels each. The imagery data is divided into the set of patches. In an embodiment, the size of patches is determined based on a prerequisite of the machine learning model that has been implemented for liveness detection. In an embodiment, the patches are of high resolution. In an embodiment, all patches from the set of the patches are of the same size. In an embodiment, the patches can overlap each other. In an embodiment, the extreme pixels from the patch split can be excluded from the set to improve the efficiency of the liveness detector 104.

The liveness detection component 126 by using the machine learning module 124, which can include one or more machine learning models configured to analyze each patch by one or more analysis modules, referred to as first analysis module, second analysis module and so on. A certain patch of the set of patches may be indicative of abnormality known to the machine learning module 124. The machine learning module 124 then aggregates results of each patch generated by the analysis module to determine a verdict as to whether the image is real or fake. Finally, the machine learning module 124 compares the verdicts of each analysis module to classify if the image is live or it should be registered as a threat.

In an embodiment, the machine learning module 124 is a pretrained CNN. Examples of deep CNN models include AlexNet, VGGNet, GoogLeNet, ResNet, etc.

In an embodiment, a training pipeline of the machine learning module 124 is identical to the liveness detection pipeline. The components in both pipelines are aligned in similar order to ensure uniformity and efficiency of the analysis. This is achieved by using a single application or SDK to capture the image and store the available metadata in a single pipeline to process the collected data. An example of the data collected may include, but may not be limited to, picture (photo, video, a set of images made by the user), image metadata (time and date of the photo, camera type, geo-location, resolution, image size), environment data (operating system version, device model, image storage path), derived data (data checksums, feature revealed during image decoding, features identified during the detection of objects in the image).

In an embodiment, the machine learning module 124 is trained in two broad stages. In a first stage of training, images are received from an image depository or an imagery database and converted into a set of patches. The sets of patches can be the sets of maximum squares covering the original image. The sets of patches can also be stochastic sets of overlapping patches without the need to resize an original image.

Some machine learning models in ensemble 124 are trained in OOD (out-of-distribution) aware mode in order to deal with unknown types of attacks by using highly diverse huge dataset of originals, including only known types of attacks in training and validation datasets, using majority of attacks data in validation and testing, training to distinguish between original and fake. Machine learning models of an ensemble 124 can be generated using an artificial neural network (ANN), decision tree, support-vector machine (SVM), regression analysis, Bayesian network, Gaussian process, generic algorithm (GA), or any other suitable machine learning system model.

In an embodiment, the second stage of training, the patches are labeled, identifying if any abnormalities are there in the patches. Labeling is a process of adding the label to the metadata of training dataset. The label is corresponding to the image sample, the patch or to a class of images. The label can be a number, a string, that indicates the class of the corresponding object and is processed further to classify a sample.

In an embodiment, the liveness detector 104 may include one or more liveness detection components, such as those described above with respect to liveness detection component 126.

Figure 2A:
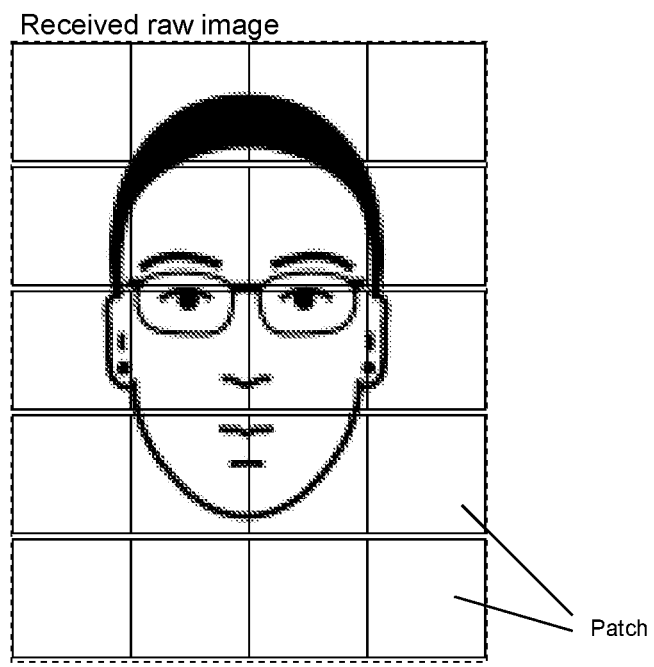
FIG. 2A illustrates a raw image split into a set of patches without overlapping each other, in accordance with an embodiment.

FIG. 2A illustrates a raw image split into a set of patches without overlapping each other, in accordance with an embodiment. As illustrated in FIG. 2A, the raw image is received and segmented into multiple patches. Each patch is a container, containing pixels and metadata corresponding to the respective patch. Each patch container is then further encoded and decoded, and further, pixels are processed to be analyzed.

Figure 2B:
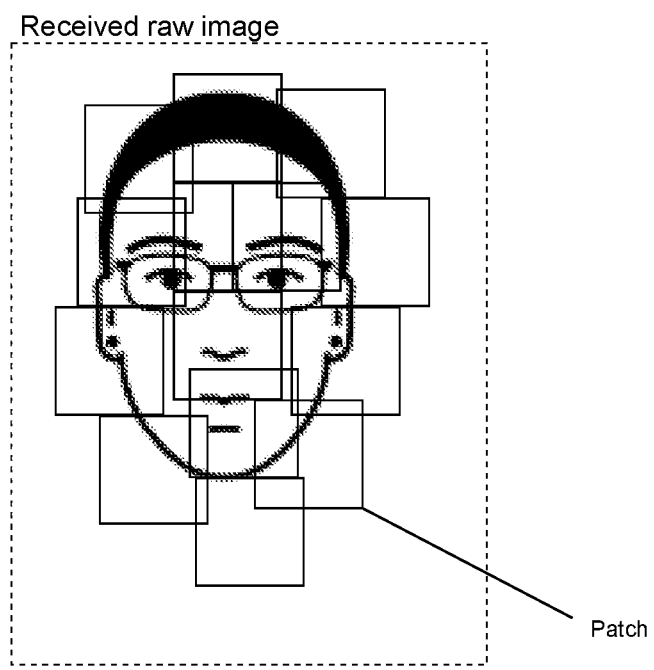
FIG. 2B illustrates a raw image split into a set of patches overlapping each other, in accordance with an embodiment.

FIG. 2B illustrates a raw image split into a set of patches overlapping each other, in accordance with an embodiment. As illustrated in FIG. 2B, the raw image is received and segmented into multiple patches which overlap with each other. Though overlapping, each patch is of the same size. Proper segmentation of the image into the set of patches, along with the metadata, preserves the characteristics of the images even during the image processing involving encoding, transmission, decoding, and patching. The patches, overlapping or not, are processed and analyzed individually. Patch segmentation without overlapping leads to empty data corresponding to the part of the patch that goes beyond the image boundaries, because. not all images can be multiples of area patch sizes. At the same time, the use of patches of different sizes will require training and the use and support of different models, each of which will be trained for a certain patch size. Patch overlay also allows to position the patch in such a way as to capture an area of interest characterized by image features. For example, the patch may cover the detected object, areas of increased contrast, areas of color distortion (color contrast), and other areas with known properties.

Figure 3:
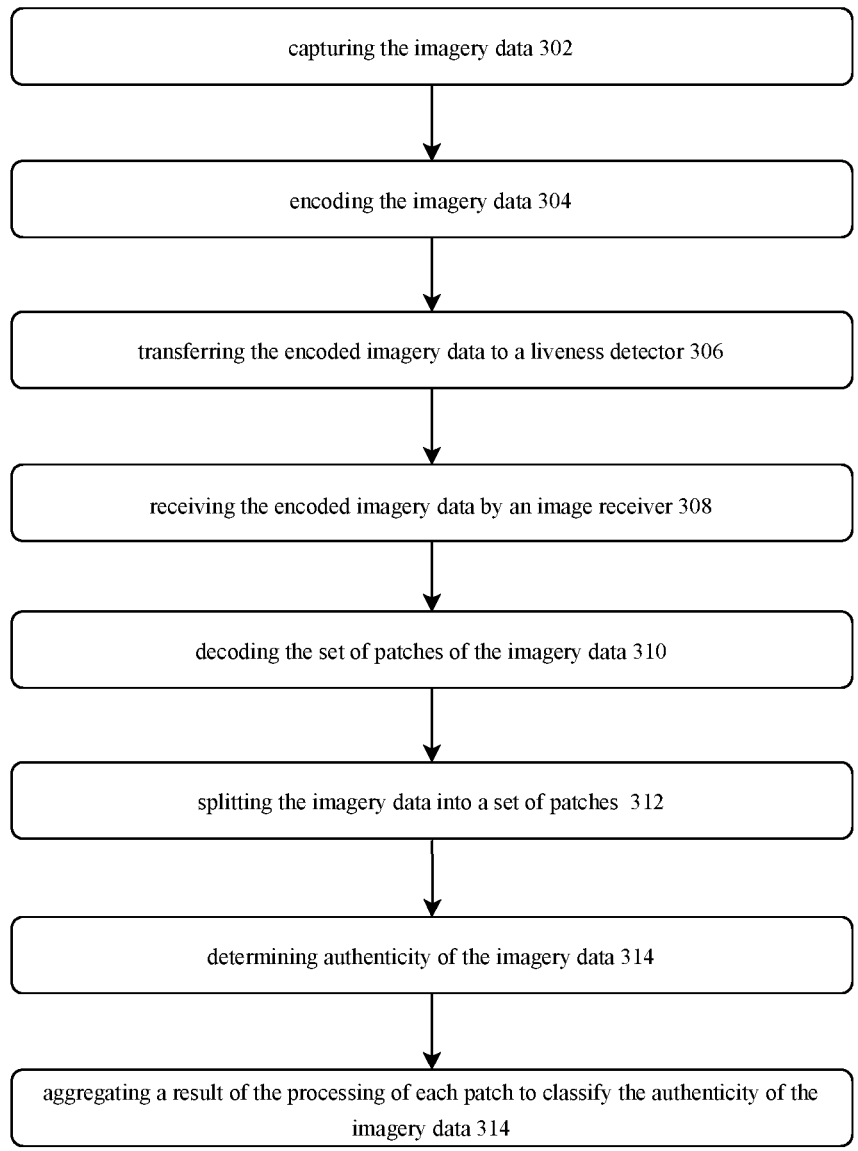
FIG. 3 is a flowchart of a method for detecting liveness of imagery data, in accordance with an embodiment.

FIG. 3 is a flowchart of a method for detecting liveness of imagery data. The method utilizes splitting an image into a set of patches of high resolution and analyzing each patch to identify the liveness of the image.

At 302, the method includes capturing the imagery data by an image capturing device, such as a camera integrated with a smartphone. For example, a user of a financial transaction application may be asked to click a photo for self-identification.

At 304, the method includes encoding the imagery data by an image encoder 114 or a video encoder.

At 306, the method includes transferring the encoded imagery data to a liveness detector 104 by a transfer component 116.

At 308, the method includes detecting liveness of the imagery data by the liveness detector 104. Detecting liveness comprises receiving, at 308, the encoded imagery data from the transfer component 116 by an image data receiver 118.

At 310, the method includes decoding the imagery data by at least one of an image decoder and a video decoder. For example, image decoder 120 can be used to decode the imagery data.

At 312, the method includes splitting the imagery data into a set of patches by the image processor. The set of patches are randomized or predefined. The patches may be pixels corresponding to the rectangular segment of predefined size, stored in a container along with the metadata.

The method includes detecting liveness of the imagery data by the liveness detection component at 314. Liveness of the imagery data is determined, by a liveness detection component 126, by analyzing each patch by a machine learning model. Further, at 316, a result of the processing of each patch is aggregated with another machine learning model to determine the liveness of the imagery data.

Figure 4:
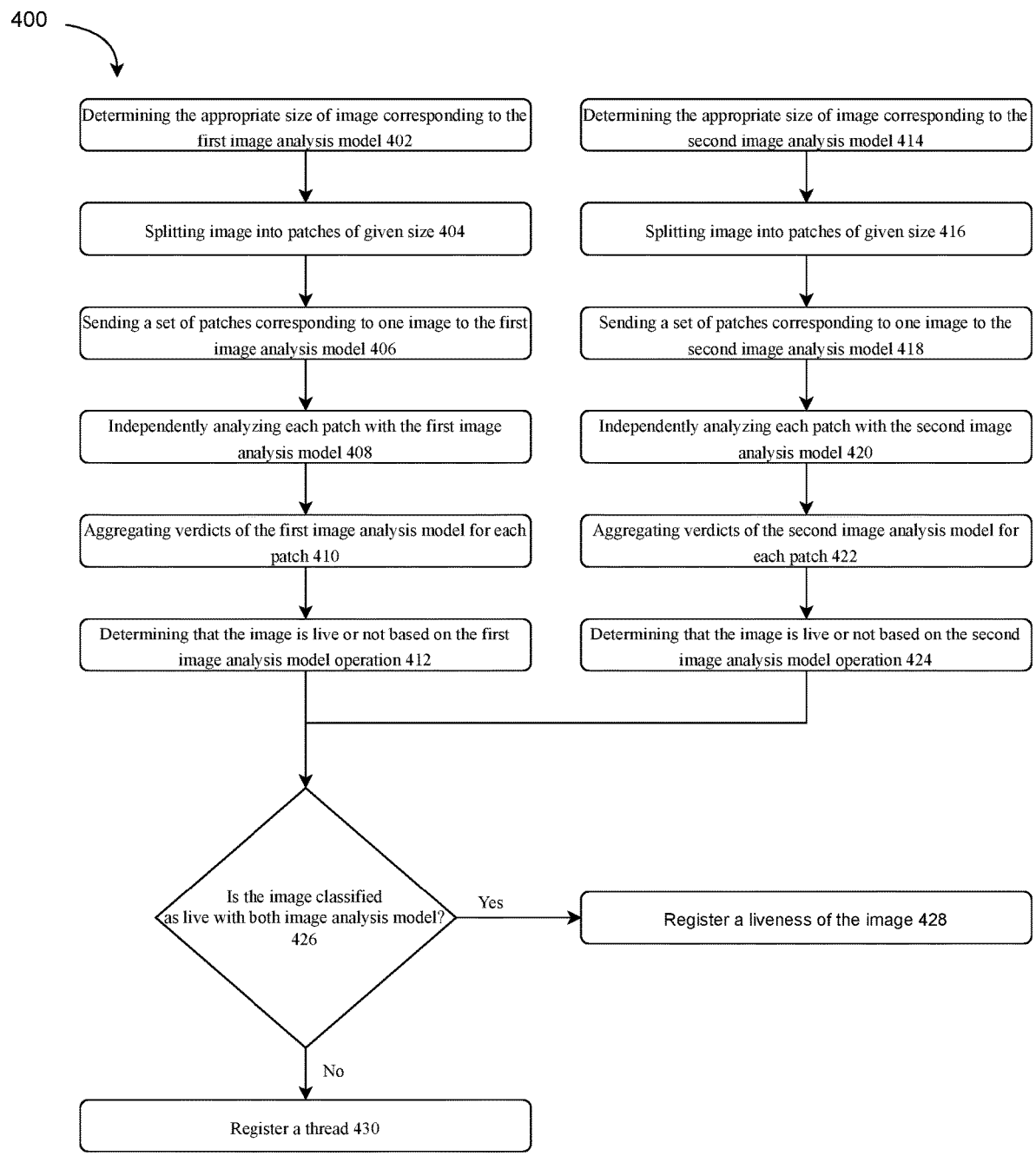
FIG. 4 is a flowchart of a method for detecting liveness of imagery data, in accordance with an embodiment.

FIG. 4 is a flowchart of a method for detecting liveness of imagery data, in accordance with an embodiment. As described earlier, the system may include one or more image analysis modules, such as first image analysis module, second analysis module and so on. The first image analysis module may be based on a specific machine learning model with specific requirements of image inputs. The second analysis module may be based on a different machine learning model and have different input requirements than that of the first image analysis module and so on. In the system, each image may be split into the number of patches to comply with the respective image analysis module.

As illustrated in FIG. 4, the first image analysis module and the second image analysis modules are implemented, in an embodiment. In an embodiment, the image analysis module can be the liveness detection component 126.

The first image analysis module is configured to classify the image as live or fake. At 402, the system determines an appropriate size of the first image corresponding to the prerequisite of the first image analysis model. At 404 the first image is split into a set of patches of determined size. At 406, the set of patches is sent to the first image analysis module. At 408, each patch is analyzed independently by the first image analysis model. At 410, the scores generated by the first analysis model for each patch are aggregated. At 412, it is determined that the first image is live based on the aggregated score.

The second image analysis model is configured to classify the image as live or fake. At 414, the system determines an appropriate size of the first image corresponding to the prerequisite of the second image analysis model. The size corresponding to the second image analysis model can differ from the size corresponding to the first image analysis model. The size appropriate for the model depends on the complexity of the operations performed with the patch during its classification. If the operations are not complex in terms of computation and memory, then the patch size can be increased. At 416 the first image is split into a set of patches of determined size. At 418, the set of patches is sent to the second image analysis module. At 420, each patch is analyzed independently by the second image analysis module. At 422, the scores generated by the second image analysis module for each patch are aggregated. At 424, it is determined that the first image is live based on the score aggregated by the second image analysis module.

At 426, the aggregated scores of the first image analysis module and the second image analysis module are compared. If the aggregated scores classify the image as live, registering the first image as a live image at 428. If the aggregated scores classify the image as not live, registering a security thread at 430. In an embodiment, the security thread registered at 430 can be further evaluated by system operations.

The invention claimed is:

1. A method for detecting liveness of an imagery data, implemented by a liveness detector, the method comprising:
   capturing the imagery data by an image capturing device;
   encoding the imagery data by at least one of an image encoder and a video encoder to generate encoded imagery data;
   transferring the encoded imagery data to a liveness detector by a transfer component;
   receiving the encoded imagery data by an image receiver;
   decoding the encoded imagery data by at least one of an image decoder and a video decoder;
   splitting the imagery data into a set of patches by an image processor, wherein a size of a patch is based on prerequisite of a machine learning model utilized by the liveness detector;
   detecting liveness of the imagery data by the liveness detection component, wherein detecting liveness includes:
      determining liveness of the imagery data by analyzing each patch by a machine learning model, and
      aggregating a result of the processing of each patch with another machine learning model to determine the liveness of the imagery data.

2. The method of claim 1, wherein splitting the imagery data into the set of patches comprises splitting the imagery data in the same size of patches allowing the patches to overlap each other.

3. The method of claim 1, further comprising:
   aligning an interference pipeline and a training of machine learning models pipeline in an identical order to ensure that no information is lost during transformations and there is no difference between transformations impact during training and inference.

4. The method of claim 1, further comprising:
   training the machine learning model based on multiple sets of patches for high resolution representation including sets of maximum squares covering an original imagery data, stochastic sets of overlapping patches without resizing the original imagery data, sets of overlapping patches with predefined disposition and quantity and without resizing the original imagery data.

5. The method of claim 1, further comprising:
   training the machine learning model in an Out Of Distribution (OOD) aware mode wherein OOD aware mode, wherein the OOD aware mode comprises:
      using extensive and diverse database of original imagery data;
      including known types of attacks in training and validation of datasets; and
      training the machine learning model to capture at least one specific property of original data to distinguish between original and non-original data.

6. The method of claim 1, further comprising:
   implementing a machine learning model to determine liveness of the imagery data, wherein implementing the machine learning model comprises determining authenticity of a first image by a first image analysis module that comprises:
      determining an appropriate size of the first image,
      splitting the first image into a set of patches of determined size,
      sending the set of patches to the first image analysis module,
      analyzing, independently, each patch of the set of the patches by the first image analysis module, and
      aggregating scores generated by the first analysis module for each patch,
      determining, based on the aggregated score, that the first image is live.

7. The method of claim 1, wherein the set of patches are randomized or predefined.

8. The method of claim 1, further comprising confining the imagery data to a container.

9. The method of claim 6, further comprising:
   implementing a second machine learning model to determine liveness of the imagery data, and wherein implementing the machine learning model comprises determining authenticity of a first image by a second image analysis module that comprises:
      determining an appropriate size of the first image for the second machine learning model,
      splitting the first image into a set of patches of determined size,
      sending the set of patches to the second image analysis module,
      analyzing, independently, each patch of the set of the patches by the second image analysis module,
      aggregating scores generated by the second analysis module for each patch,
      determining, based on the aggregated score of the first analysis module and the second analysis module, that the first image is live.

10. A system for liveness detection comprising:
    an image capturing device to capture imagery data;
    an image encoder to encode the imagery data to generate encoded imagery data;
    a transfer component to transfer the imagery data to a liveness detector;
    an imagery data receiver to receive the encoded imagery data from the transfer component,
    an image decoder to decode the imagery data,
    an image processor to split the imagery data into a set of patches, wherein the size of a patch is based on prerequisite of a machine learning model utilized by the liveness detector;
    a liveness detection component configured to:
       classify the imagery data based on authenticity, wherein the liveness detection component is configured to analyze each of the set of patches by a machine learning model, and
       aggregate a result of the processing of each patch to determine the authenticity of the imagery data.

11. The system of claim 10, wherein the imagery data is split in the same size of patches allowing the patches to overlap each other.

12. The system of claim 10, wherein components of an inference pipeline of the liveness detection component and a training pipeline of the machine learning module are in an identical order.

13. The system of claim 10, wherein the machine learning module is trained based on multiple sets of patches for high resolution representation including sets of maximum squares covering an original imagery data, stochastic sets of overlapping patches without resizing the original imagery data, sets of overlapping patches with predefined disposition and quantity and without resizing the original imagery data.

14. The system of claim 12, wherein the machine learning module is trained in an Out Of Distribution (OOD) aware mode, wherein the OOD aware mode is configured to:
   use extensive and diverse database of original imagery data;
   include known types of attacks in training and validation of datasets;
   use data corresponding to majority of attacks in validation and testing of datasets; and
   train the machine learning model to capture at least one specific property of original data to distinguish between original and non-original data.

15. The system of claim 10, wherein the liveness detection component is configured to implement a machine learning model to determine liveness of the imagery data, and wherein the machine learning model is configured to:
   split an image into a set of patches of determined size,
   send the set of patches to the image analysis module,
   analyze, independently, each patch of the set of the patches by the machine learning model,
   aggregate scores generated by the machine learning model for each patch using another machine learning model, and
   determine, based on the aggregated score, that the first image is live.

16. The system of claim 10, wherein the set of patches are randomized or predefined.

17. The system of claim 10, wherein the image capturing device is further configured to confine the imagery data to a container.

18. A system for liveness detection of an image, the system comprising:
   a first machine learning model trained on a first plurality of image data including a first plurality of patch data;
   a second machine learning model trained on a second plurality of image data including a second plurality of patch data;
   an image processor configured to split the image into a set of patches; and
   a liveness detection module configured to:
      determine an authenticity of each patch in the set of patches by analyzing each patch in the set of patches using the first machine learning model, and
      classify the authenticity of each patch to determine a liveness of the image data using the second machine learning model.

19. The system of claim 18, wherein the liveness detection module is further configured to determine a liveness of the image data using an aggregation of the authenticity of each patch and the determination of liveness of the image data.

20. The system of claim 18, wherein each patch in the set of patches is a container including a plurality of pixels and metadata corresponding to the patch.

* * * * *